(12) United States Patent
Lucidarme et al.

(10) Patent No.: US 6,229,239 B1
(45) Date of Patent: May 8, 2001

(54) ELECTRICAL MACHINE WITH DOUBLE EXCITATION

(75) Inventors: Jean Lucidarme, Ste Genevieve des Bois; Abdelhamid Ben Ahmed, St Maur; Mohamed Gabsi, Cachan; Bernard Multon, Rennes; Eduardo Santander, Thiais; Emmanuel Hoang, Paris; Michel Lecrivain, Ivry sur Seine, all of (FR)

(73) Assignee: Centre National de la Recherche Scientifique (C.N.R.S), Paris (FR)

( * ) Notice: Subject to any disclaimer, the term of this patent is extended or adjusted under 35 U.S.C. 154(b) by 0 days.

(21) Appl. No.: 09/403,542
(22) PCT Filed: Apr. 16, 1998
(86) PCT No.: PCT/FR98/00771
  § 371 Date: Feb. 23, 2000
  § 102(e) Date: Feb. 23, 2000
(87) PCT Pub. No.: WO98/48502
  PCT Pub. Date: Oct. 29, 1998

(30) Foreign Application Priority Data

Apr. 23, 1997 (FR) .................................................. 97 05030

(51) Int. Cl.[7] .......................... H02K 19/00; H02K 37/00; H02K 21/12; H02K 1/22
(52) U.S. Cl. ...................... 310/162; 310/49 R; 310/156; 310/261; 310/263; 310/268
(58) Field of Search ................................... 310/162, 112, 310/114, 49 R, 156, 261, 263, 264, 268, 269

(56) References Cited

U.S. PATENT DOCUMENTS 3,573,519   4/1971  Kumazawa ........................... 310/156
3,849,682 * 11/1974  Binns .................................... 310/156
3,904,902 *  9/1975  Inariba .................................. 310/162
4,672,247 *  6/1987  Madsen et al. ..................... 310/49 R
4,764,697 *  8/1988  Christiaens .......................... 310/49 R
5,952,758 *  9/1999  Lucidarme et al. ................. 310/162

FOREIGN PATENT DOCUMENTS 41 15 887     5/1991   (DE) .
2 189 909     1/1974   (FR) .

OTHER PUBLICATIONS

R. Zmood et al., "High Performance Magnetic Bearings Suitable For Noise Cancellation In Permanent Magnet Motor Driven Pumps", *Proceedings of the Intersociety Energy Conversion Engineering Conference (IECEC)*, Boston, vol. 4 Aug. 4, 1991, pp. 198–202.

* cited by examiner

*Primary Examiner*—Nestor Ramirez
*Assistant Examiner*—Dang Dinh Le
(74) *Attorney, Agent, or Firm*—Young & Thompson

(57) ABSTRACT

A double excitation, rotating electrical machine mounted on a shaft includes a rotor whereof the magnetic circuit carries at least one excitation element and a stator whereof the magnetic circuit carries a stator coil. The at least one excitation element includes at least a ring-shaped magnet associated with at least two disks each provided with radial teeth evenly distributed at their periphery and at least a ring-shaped part provided with slots in each of which is engaged contactless, one tooth of at least one toothed disk, and the stator magnetic circuit includes an even number, not less than two, of ring-shaped elements of magnetic circuit, at least an excitation stator coil being arranged between at least two neighboring elements among the magnetic circuit elements.

13 Claims, 4 Drawing Sheets

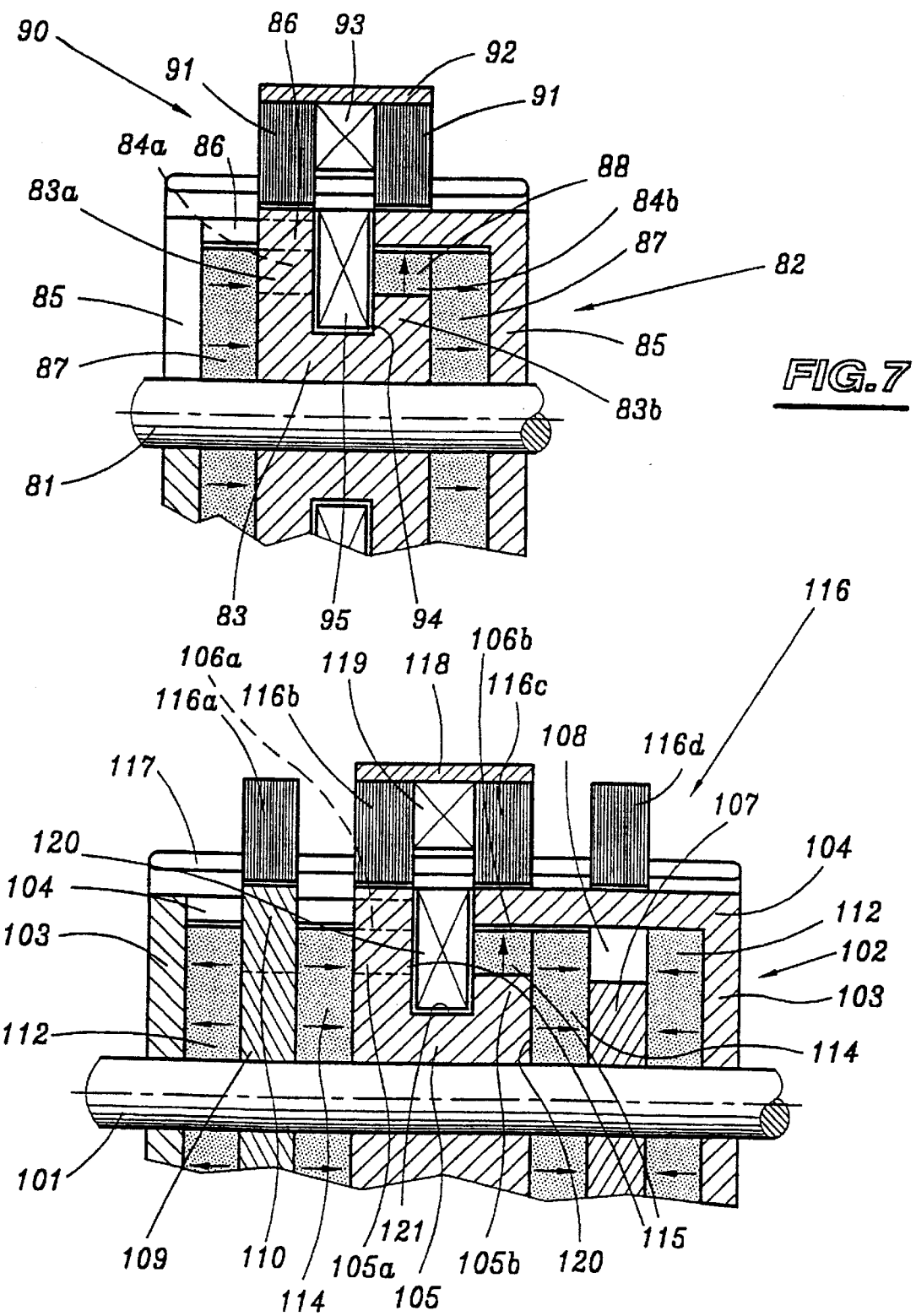

ELECTRICAL MACHINE WITH DOUBLE EXCITATION

BACKGROUND OF THE INVENTION

The present invention relates to rotating electrical machines and more particularly to synchronous machines such as alternators for motor vehicles, traction engines or other machines.

Among the known machines, mention may be made of machines with excitation by windings mounted in the rotor, machines with excitation by magnets mounted in the rotor and machines with double excitation by both windings and magnets mounted in the rotor.

Such machines are especially described in Patent Application FR 97/03429 filed on Mar. 20, 1997 by the Applicant.

Although giving acceptable results, the known double-excitation machines are relatively bulky because of the presence of brushes and slip rings.

SUMMARY OF THE INVENTION

The invention therefore aims to create a rotating electrical machine of the double-excitation type which, whilst still having good performance characteristics, is less bulky than the known machines of the same type.

The subject of the invention is therefore a rotating electrical machine comprising, mounted on a shaft, a rotor whose magnetic circuit carries at least one excitation element and a stator whose magnetic circuit carries a stator winding, characterized in that the at least one said excitation element of the rotor comprises at least one annular magnet associated with at least two discs each provided with radial teeth uniformly distributed around their periphery and at least one annular piece provided with slots in each of which a tooth of at least one toothed disc is engaged without any contact, and in that the magnetic circuit of the stator includes an even number, at least equal to two, of annular magnetic-circuit elements, at least one stator excitation winding being arranged between at least two adjacent elements among the said magnetic-circuit elements.

BRIEF DESCRIPTION OF THE DRAWINGS

The invention will be more clearly understood with the aid of the description which follows, given solely by way of example and with reference to the appended drawings, in which:

FIG. 7 is a cross-sectional partial view of a double-excitation machine with an offset stator excitation winding in the rotor; and FIG. 8 is a cross-sectional partial schematic view of a double-excitation electrical machine according to the invention resulting from the juxtaposition of a machine of FIG. 7 and of machines similar to that of FIG. 3.

DESCRIPTION OF THE PREFERRED EMBODIMENTS

Figure 1:
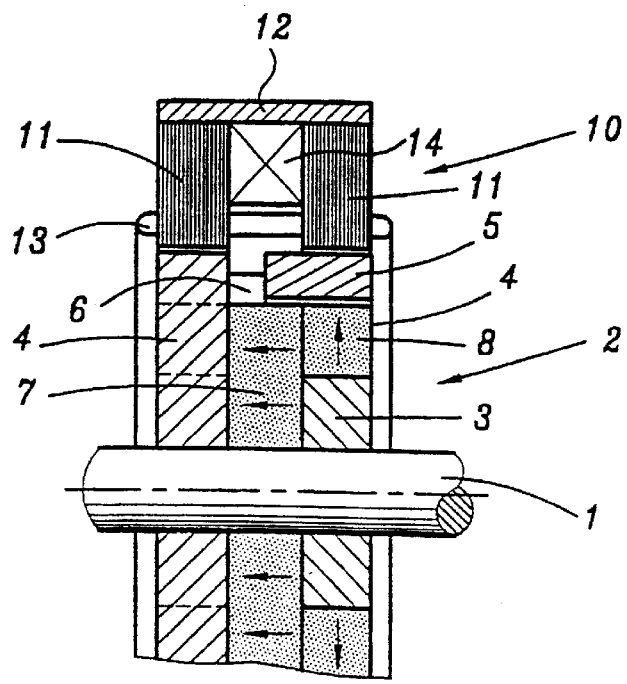
FIG. 1 is a cross-sectional partial schematic view of an elementary double-excitation rotating electrical machine according to the invention.

The electrical machine shown in FIG. 1 is a machine comprising, mounted on a shaft 1 made of non-magnetic material, a rotor 2 whose magnetic circuit includes toothed discs 3 provided with radial teeth 4 uniformly distributed around their periphery.

The radial teeth 4 of one plate 3 are offset with respect to the radial teeth of the other plate so that a tooth of one plate lies opposite a gap between the teeth of the other plate.

An annular piece 5 provided with slots 6 uniformly spaced around its periphery, which in the present example are made in the form of axial slots emerging at the opposite ends of the annular piece, is mounted coaxially with respect to the shaft 1. The teeth 4 of the toothed discs 3 are engaged in corresponding slots 6 in the annular piece 5 without any contact with the walls of the said slots. The annular piece 5 is fastened to the shaft 1 by any suitable mechanical means (not shown).

Placed between the toothed discs 3 is an annular excitation magnet 7.

Moreover, in the example shown in FIG. 1, magnets 8 are placed in the gaps between the teeth 4 of the toothed discs 3 and the walls of the corresponding slots 6 of the annular piece 5.

However, the gaps between the teeth 4 may also be devoid of such magnets.

The rotor 2 is surrounded by a stator 10 comprising a laminated magnetic circuit formed from two magnetic-circuit elements 11 joined together by an external annular yoke 12 and on which an armature winding 13 is mounted. An excitation winding 14 is placed between the magnetic-circuit elements 11.

Figure 2:
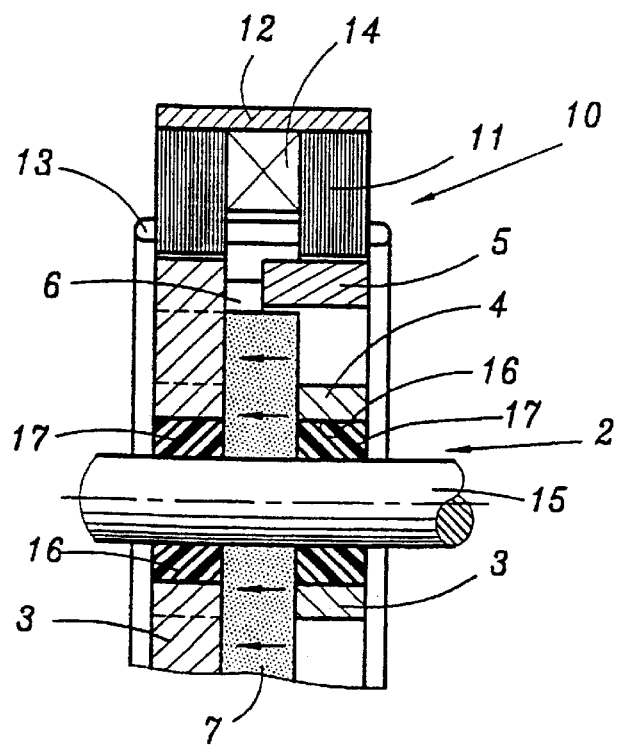
FIG. 2 is a cross-sectional partial schematic view of a variant of the elementary machine in FIG. 1.

The electrical machine shown in FIG. 2 is in every way similar to that of FIG. 1 apart from the fact that it has a shaft 15 made of a magnetic material and from the fact that the toothed discs 3 each have a central bore 16 ensuring that they are magnetically separated from the shaft 15.

Advantageously, a ring of insulating material 17 is placed in each central bore 16.

Furthermore, in the present embodiment, the gaps between the teeth 4 of the toothed discs 3 and the walls of the slots 6 of the annular piece 5 are devoid of magnets.

Figure 3:
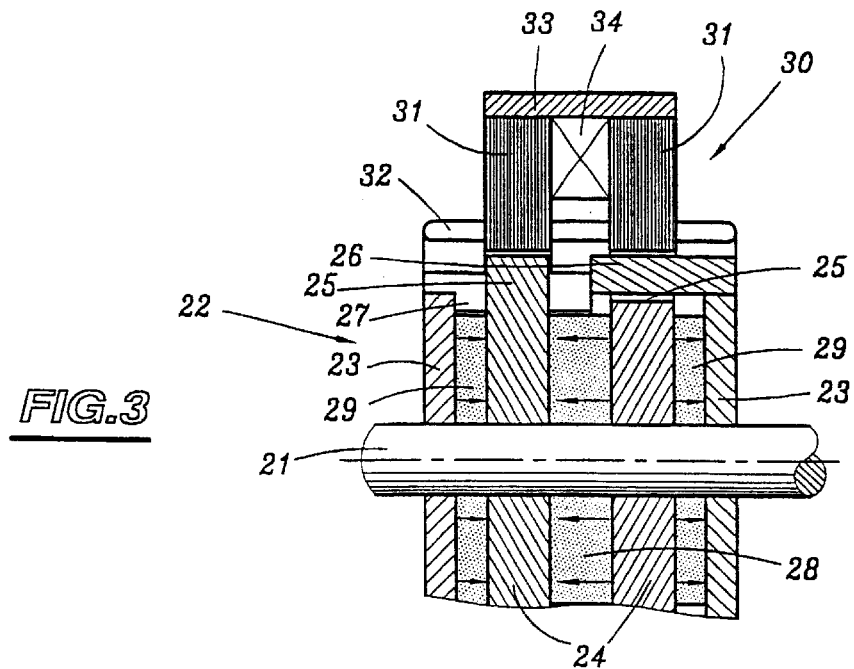
FIG. 3 is a cross-sectional partial schematic view of complete double-excitation electrical machine produced frog the elementary machine in FIG. 1.

The electrical machine shown in FIG. 3 has a shaft 21 made of non-magnetic material carrying a rotor 22 which includes two end plates 23 between which two toothed discs 24 are placed, the said toothed discs 24 being provided with radial teeth 25 placed at regular angular intervals, the teeth of one of the discs being angularly offset with respect to the teeth of the other disc.

Mounted on the end plates 23 is an annular piece 26 provided with slots 27 which, in the present example, are axial slots and in which the teeth 25 of the toothed discs 24 are engaged without any contact.

Excitation magnets 28, 29 are placed, on the one hand, between the toothed discs 24 and, on the other hand, between each toothed disc and the corresponding end plate 23.

The excitation magnet 28 placed between the toothed discs 24 and the excitation magnets 29 placed between each toothed disc and its corresponding end plate 23 are of reverse polarities.

The rotor thus formed is surrounded by a stator 30 comprising a magnetic circuit formed from two magnetic-circuit elements 31 each placed opposite a corresponding toothed disc 24 and on which a stator winding 32 is mounted.

The magnetic-circuit elements 31 are joined together by a yoke 33. Placed between the magnetic-circuit elements 31 is an excitation winding 34.

Figure 4:
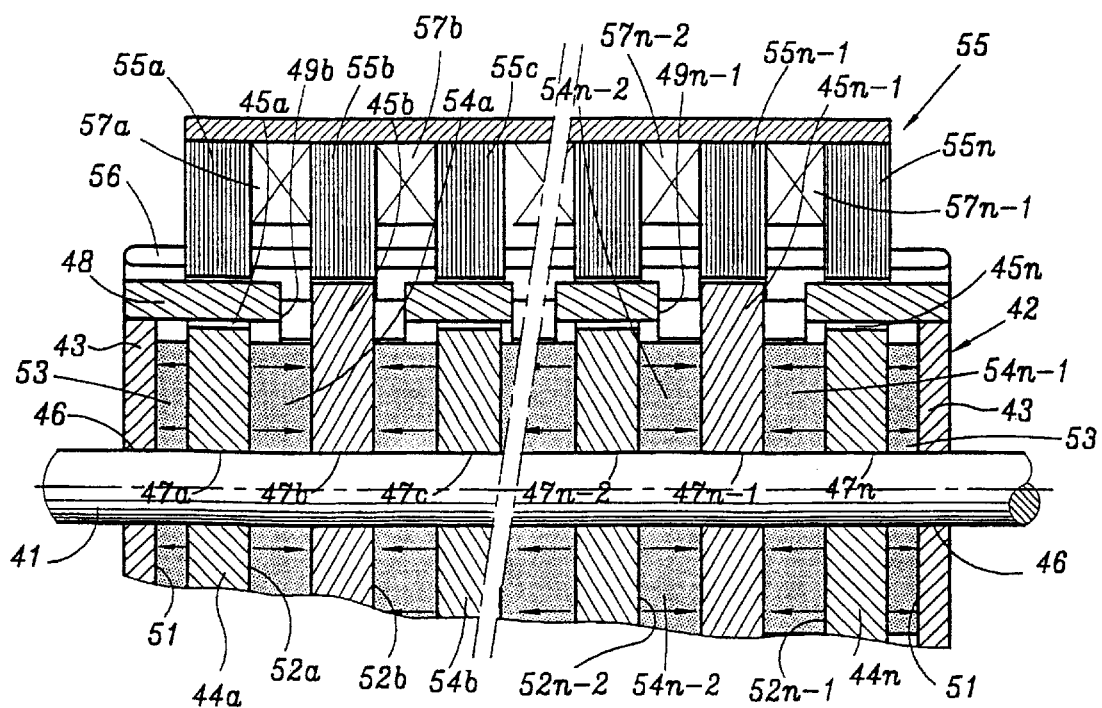
FIG. 4 is a cross-sectional partial view of a double-excitation electrical machine resulting from the juxtaposition of several elementary machines of FIG. 1.

The electrical machine shown in FIG. 4 results from the juxtaposition of several elementary machines such as that shown in FIG. 1.

It has a common shaft 41 made of non-magnetic material which carries a rotor 42 formed from two end plates 43 and of toothed discs 44a to 44n, n being an even number at least equal to two.

Each of the toothed discs 44a to 44n has teeth 45a to 45n offset one with respect to another.

The end plates 43 and the toothed discs 44a to 44n have bores 46 and 47a to 47n through which the non-magnetic shaft 41 passes. An advantageous embodiment consists in producing this annular piece by assembling n coaxial elementary annular pieces. Mounted on the end plates 43 is an annular piece 48 perforated by slots 49a to 49n uniformly distributed around its periphery and offset one with respect to another. The teeth 45a to 45n of the toothed discs 44a to 44n are engaged in the corresponding slots 49a to 49n without any contact with the latter.

Placed in the gaps provided between the end plates 43 and the toothed discs 44a to 44n, defining with the shaft 41 and the perforated piece 48 forming a sleeve joined to the end plates, on the one hand, two end chambers 51 located between the first end plate 43 and the adjacent toothed disc 44a and between the second end plate 43 and the adjacent toothed disc 44n and, on the other hand, chambers 52a to 52n–1 located between the toothed discs 44a to 44n, are annular magnets 53 and 54a to 54n–1, respectively.

The arrangement of these annular magnets is such that the polarities of the two adjacent magnets are of opposite sign or polarity.

The excitation magnets 53 located in the end chambers 51 have a thickness equal to half that of the magnets 54a to 54n–1 located in the chambers 52a to 52n–1 defined between the successive toothed discs 44a to 44n.

The rotor that has just been described is mounted in a stator 55 having as many magnetic-circuit elements 55a to 55n as the rotor has toothed discs 44a to 44n. A common armature stator winding 56 is mounted on these magnetic-circuit elements.

Spaced between two successive adjacent magnetic-circuit elements is a corresponding excitation winding 57a to 57n–1.

Figure 5:
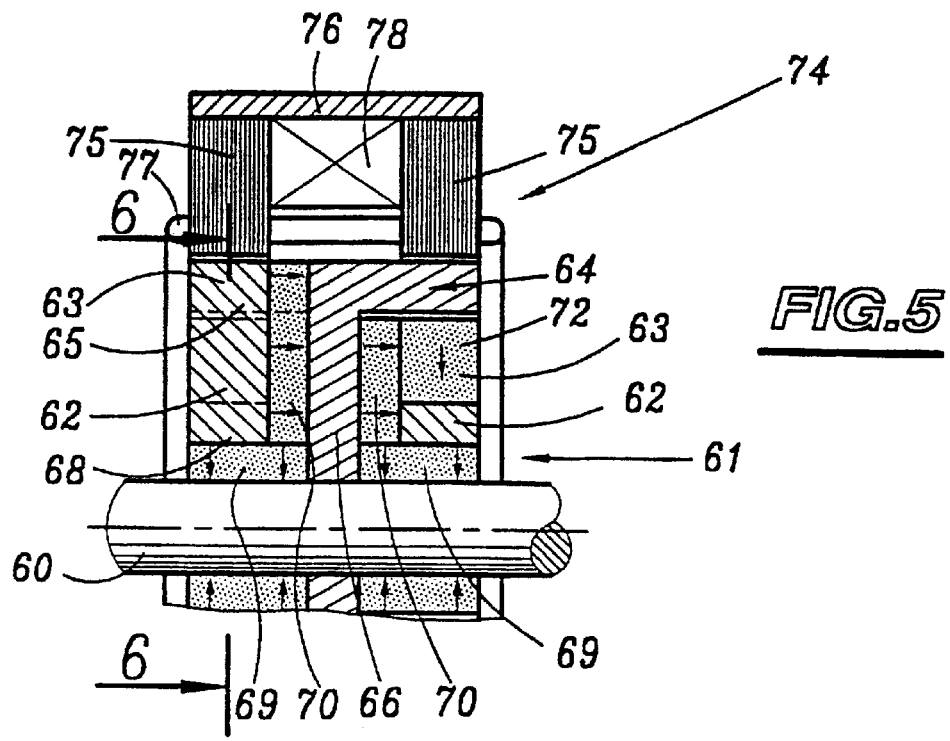
FIG. 5 is a cross-sectional partial schematic view of a double-excitation machine of a particular type.

The electrical machine shown in FIG. 5 has a shaft 60 made of magnetic material on which is mounted a rotor 61 comprising two toothed discs 62 whose radial teeth 63 are uniformly distributed around the periphery of each disc, the teeth of one of the discs being offset with respect to those of the other.

The shaft 60 furthermore carries an annular piece 64 provided with slots such as the slot 65 which, in the present embodiment, consist of axial slots and in which the teeth 63 of the toothed discs 62 are engaged without any contact.

The annular piece 64 is linked to the shaft 61 by a disc-shaped central core 66.

The toothed discs 62 each have, surrounding the shaft 60, a bore 68 in which annular magnets 69 are placed.

Figure 6:
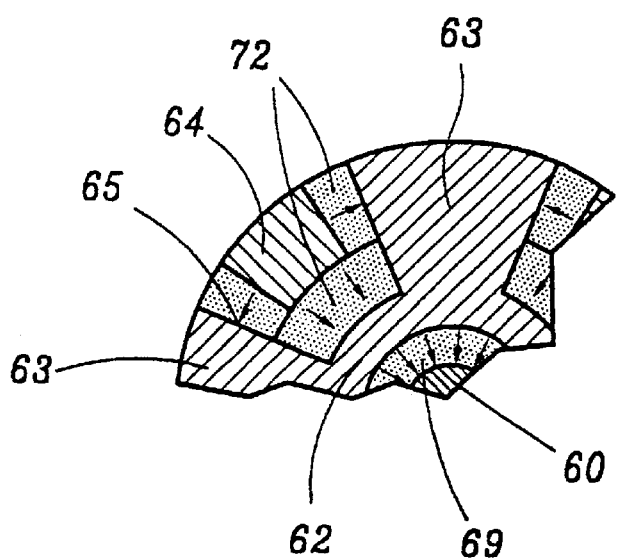
FIG. 6 is a cross section on the line 6—6 of the machine in FIG. 5 without its stator.

Magnets 70 are also placed between the core 66 and each of the toothed discs 62, while, as shown in FIG. 6, the gaps between the teeth 63 of each of the toothed discs 62 and the walls of the slots 65 in the annular piece 64 are furnished with magnets 72.

The gaps between the teeth 63 of the toothed pieces 62 and the walls of the notches 65 in each annular piece 64 may also be devoid of such magnets.

The rotor that has just been described is surrounded by a stator 74 which has a magnetic circuit formed from two laminated annular magnetic-circuit elements 75 joined together by an external yoke 76 and carrying an armature winding 77.

An excitation winding 78 is furthermore provided between the magnetic-circuit elements 75.

The machine shown in FIG. 7 has a non-magnetic shaft 81 which carries a rotor 82 formed from a toothed double disc 83 mounted on the shaft 81 and provided with radial teeth 84a, 84b made on each of the elements 83a, 83b of the toothed double disc which thus define two toothed discs. The teeth 84b are angularly offset with respect to the teeth 84a.

Mounted on either side of the toothed double disc 83 are end plates 85 provided with teeth which between them define axial slots 86 in which the radial teeth 84a and 84b of the toothed double disc 83 are engaged without any contact.

The end plates 85 provided with axial teeth defining annular pieces similar to those of the embodiments described previously.

Placed between the end plates 85 and the opposite ends of the toothed double disc 83 are annular excitation magnets 87.

Furthermore, magnets 88 are placed in the spaces left free between the teeth 86 of the end plates 85 and the teeth 84a, 84b of the toothed double disc 83.

The magnets 88 may also be omitted.

The rotor thus formed is surrounded by a stator 90 comprising a magnetic circuit formed from two laminated magnetic-circuit elements 91 each placed opposite one of the elements 83a, 83b of the toothed double disc 83 and joined together on the outside by a yoke 92.

An excitation winding 93 is placed between the two magnetic-circuit elements 91.

Made in the toothed double disc 83 of the rotor 82 is a groove 94 in which a second stator excitation winding 95 is placed.

According to a variant, the machine shown in FIG. 7 may have only one excitation winding such as the winding 93 located between the magnetic-circuit elements 91 of the stator, or else a single excitation winding such as the winding 95 placed in the annular groove 94 of the toothed double disc 83.

The electrical machine shown in FIG. 8 results from the juxtaposition of a double-excitation electrical machine of the type shown in FIG. 7 and of an elementary machine such as that described with reference to FIG. 3.

It has a shaft 101 made of non-magnetic material which carries a rotor 102 comprising end plates 103 provided with teeth defining, between them, axial slots 104 which are uniformly distributed around their periphery and facing each other in order to form two perforated annular pieces or cages.

Placed between the end plates 103 made of magnetic material are intermediate toothed discs formed by a central toothed double disc 105, an element 105a of which has radial teeth 106*a* and a second element 105*b* of which has radial teeth 106*b*. The teeth 106*a*, 106*b* of the first and second elements 105*a*, 105*b* of the toothed double disc 105 are uniformly distributed around the periphery of the double disc and angularly offset one with respect to another.

On either side of the toothed double disc 105, the elements 105*a*, 105*b* of which form intermediate toothed discs, the rotor 102 has a first toothed disc 107 provided with radial teeth 108 and a second toothed disc 109 provided with radial teeth 110. The teeth 108 and 110 of the toothed discs 107 and 109 are uniformly distributed around the periphery of the corresponding discs and angularly offset.

Engaged respectively in the axial slots 104 of the end plates 103 are the teeth 106*a* of one of the elements 105*a* of the toothed double disc 105 and the teeth 108 of the adjacent first toothed disc 107, on the one hand, and the teeth 106*b* of the other element 105*b* of the toothed double disc 105 and the second teeth 110 of the corresponding toothed disc 109, on the other hand.

Magnets 115 are placed in the spaces left free between the teeth 106*a* and 106*b* of the elements 105*a* and 105*b* of the toothed double disc and the slots 104 of the end plates 103.

Annular excitation magnets 112, 114 are inserted, on the one hand, between the end plates 103 and the first and second toothed discs 107, 109 and, on the other hand, between the latter and the toothed double disc 105.

The rotor thus formed is surrounded by a stator 116 comprising a magnetic circuit formed from four magnetic-circuit elements 116*a*, 116*b*, 116*c*, 116*d* and on which an armature stator winding 117 is mounted. Each of the annular circuit elements 116*a* to 116*d* is placed opposite the radial teeth of a toothed disc 107, 109 and opposite each of the elements 105*a*, 105*b* of the toothed double disc 105.

The magnetic-circuit elements 116*b*, 116*c* which are placed opposite the two elements 105*a*, 105*b* of the toothed double disc 105 are joined together by an external yoke 118. A stator excitation winding 119 is placed between the elements of the magnetic circuit 116*b* and 116*c*.

Moreover, another stator winding 120 is placed in an annular slot 121 made in the magnetic circuit of the rotor between the two elements 105*a*, 105*b* of the toothed double disc 105.

Because of the arrangement of this stator excitation winding inside a groove made in the body of the rotor, the machine described with reference to FIG. 8 is less bulky than that of known double-excitation machines. What is more together with the machine in FIG. 7, it is the least bulky of the machines according to the invention.

What is claimed is:

1. A double excitation rotating electrical machine mounted on a shaft, comprising a rotor (2; 33; 42; 61; 82; 102) whose magnetic circuit carries at least one excitation element and a stator (10; 30; 55; 74; 90; 116) whose magnetic circuit carries a stator winding, wherein the said at least one excitation element comprises at least one annular magnet (7; 28, 29; 51, 54*a*, . . . 54*n*–1; 70; 87; 112, 114) associated with at least two discs (3; 24; 44*a*, . . . 44*n*; 62; 83*a*, 83*b*; 105*a*, 105*b*, 107, 109) each provided with radial teeth uniformly distributed around their periphery and at least one annular piece (5; 26; 48; 64; 86; 104) provided with slots in each of which a tooth of at least one toothed disc is engaged without any contact, and in that the magnetic circuit of the stator includes an even number, at least equal to two, of annular magnetic-circuit elements (11; 31; 55*a*, . . . 55*n*; 75; 91; 116*a*, 116*b*, 116*c*, 116*d*), at least one stator excitation winding (14; 34; 57*a*, . . . 57*n*–1; 78; 93, 95; 119, 120) being arranged between at least two adjacent elements from among the said magnetic-circuit elements.

2. The electrical machine according to claim 1, wherein the rotor includes two toothed discs (3; 24; 62; 83*a*, 83*b*) with radial teeth (4; 25; 63; 84*a*, 84*b*), which radial teeth are angularly offset with respect to each other and engaged in axial slots (6; 27; 65; 86) of the said at least one annular piece (5; 26; 64; 85) without any contact, and the stator includes a magnetic circuit formed from two magnetic-circuit elements (11; 31; 75; 91) joined together by an external yoke (12; 33; 76; 92) and between which magnetic-circuit elements at least one stator excitation winding (14; 34; 78; 93, 95) is arranged.

3. The electrical machine according to claim 2, further comprising a stator excitation winding (14; 34; 78) placed between the magnetic-circuit elements (11; 31; 75) of the stator.

4. The electrical machine according to claim 2, further comprising a stator excitation winding (93) placed between the magnetic-circuit elements (91) of the stator and an offset excitation winding (95) in the rotor.

5. The electrical machine according to claim 2, further comprising an excitation winding in the rotor and associated with the magnetic-circuit elements of the stator.

6. The electrical machine according to claim 2, further comprising an annular piece (5; 26; 64) provided with slots in the form of axial slots (6; 27; 65) in which the teeth (4; 25; 63) of the corresponding toothed discs (3; 24; 62) are engaged without any contact.

7. The electrical machine according to claim 6, wherein the shaft (21) of the rotor is made of non-magnetic material and the annular piece (26) is carried by end plates (23) placed on either side of the toothed discs (24) on the shaft (21) of the rotor.

8. The electrical machine according to claim 6, wherein the shaft (60) of the rotor is made of magnetic material and the annular piece (64) is linked to the shaft (60) of the rotor by a disc-shaped central core (66).

9. The electrical machine according to claim 4, further comprising two annular pieces each comprising an end plate (85) provided with teeth defining therebetween axial slots (86) in which the teeth (84*a*, 84*b*) of the corresponding toothed discs (83*a*, 83*b*) are engaged without any contact, between which toothed discs is housed the said offset excitation winding (95) in the rotor (82).

10. The electrical machine according to claim 9, wherein the toothed discs are made in the form of a toothed double disc (83) mounted on the shaft (81) of the rotor and comprising two toothed elements (83*a*, 83*b*) provided with radial teeth (84*a*, 84*b*) engaged in the axial slots (86) of the corresponding annular pieces without any contact and in that the stator excitation winding (95) is placed in a slot (94) made between the said elements (83*a*, 83*b*) of the toothed double disc (83).

11. The electrical machine according to claim 9, wherein the shaft is made of non-magnetic material (101) which carries a rotor (102) comprising end plates (103) provided with teeth which define between them axial slots (104) uniformly distributed around their periphery, facing each other and forming two perforated annular pieces, the radial teeth (106*a*, 106*b*, 108, 110) of the toothed discs (105*a*, 105*b*, 107, 109) being engaged in the said axial slots (104) without any contact, and a stator (116) surrounding the rotor and including a magnetic circuit formed from the same number of magnetic-circuit elements (116*a*, 116*b*, 116*c*,

116*d*) as the number of toothed discs of the rotor, at least one stator excitation winding (119, 120) being interposed between the magnetic-circuit elements (116*b*, 116*c*) located opposite two intermediate toothed discs (105*a*, 105*b*) of the rotor and joined together by an external yoke (118).

12. The electrical machine according to claim 11, wherein the two intermediate toothed discs are made in the form of a toothed double disc (105) comprising a first and a second toothed element (105*a*, 105*b*), each provided with radial teeth (106*a*, 106*b*) and between which a slot (121) is made, in which slot is placed an offset stator excitation winding (120) in the rotor, the machine furthermore comprising, on either side of the toothed double disc (105), a first toothed disc (107) provided with radial teeth (108) and a second toothed disc (109) provided with radial teeth (110) engaged in the axial slots (104) of the annular pieces, respectively with the radial teeth (106*a*) of the first element (105*a*) and with the radial teeth (106*b*) of the second element (105*b*) of the toothed double disc (105), annular magnets (112, 114) being inserted, on the one hand, between the end plates (103) and the first and second toothed discs (107, 109) and, on the other hand, between the latter and the toothed double disc (105).

13. The electrical machine according to claim 1, wherein magnets (8; 72; 88; 115) are placed in the spaces between the radial teeth (4; 63; 84*a*, 84*b*; 106*a*, 106*b*) of the toothed discs (3; 62; 83*a*, 83*b*; 105*a*, 105*b*) and walls of the slots of the said at least one annular piece (5; 64; 85; 103).

* * * * *